March 1, 1966 J. V. KOPPENSTEINER 3,238,327

REED RELAY FOR PRINTED CIRCUIT MODULE

Filed Oct. 27, 1964

INVENTOR.
James V. Koppensteiner

BY C. A. Gulbrandsen

ATTY.

United States Patent Office 3,238,327

Patented Mar. 1, 1966

3,238,327

REED RELAY FOR PRINTED CIRCUIT MODULE

James V. Koppensteiner, Chicago, Ill., assignor to Automatic Electric Laboratories, Inc., Northlake, Ill., a corporation of Delaware Filed Oct. 27, 1964, Ser. No. 406,806
5 Claims. (Cl. 200—87)

This invention relates generally to electromagnetic relays of the type known as reed relays and particularly to a reed relay for use in a printed circuit module.

The main problem associated with the use of a relay which employs a plurality of reed switches as a component in a printed circuit module involves the connections, both physical and electrical, between the relay and the printed circuit card. In order to achieve mass, automated production of printed circuit cards, the printed circuit card industry drills mounting holes in the cards using a grid to space the mounting centers at a predetermined increment. This predetermined increment has been set at .200 inch. However, the diameters of the types of reed switches which are most often used in reed relays are greater than this predetermined increment, and this discrepancy in dimensions creates the problem in mating the reed relay with a printed circuit card. The problem could be eliminated by drilling special mounting holes for the relay, but this would substantially increase the cost of producing the module.

Therefore, it is an object of this invention to provide a reel relay with an improved terminal arrangement for providing physical and electrical connection between the relay and the printed circuit card in a printed circuit module.

It is a further object of this invention to provide an improved mounting arrangement for the reed switches in a reed relay designed for use in a printed circuit module.

The invention features a plurality of terminals mounted in platforms on the support structure of the relay and spaced at the predetermined mounting centers increment with wide tabs on the tops of the terminals to allow the lead-out elements of the reed switches to be mounted on the tab off-center where necessary.

The invention also features reed switches separately suspended in a tunnel in the support structure to provide mechanical isolation from each other and thereby to decrease the possibility of breakage of the switch capsules.

Other objects and features of the invention will be apparent from a reading of the following description in conjunction with the drawings in which.

Figure 1:
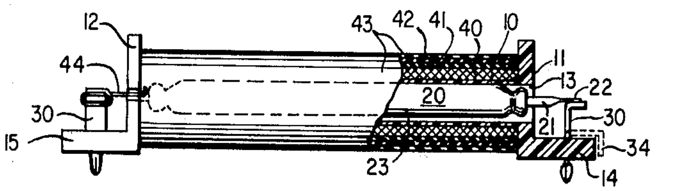
FIG. 1 is a side elevational view of the relay with a portion of the relay sectioned to show construction details.

FIGURE 1 shows the basic elements of the relay, namely a bobbin or support structure 10, an encapsulated reed switch 20, a terminal 30, and a coil 40 wound on the support structure 10.

The support structure 10 is constructed of a plastic insulating material and has a flange 11 on one end with a similar flange 12 on the other end. A tunnel 13 extends continuously through the support structure. The flange 11 has a platform portion 14 and the flange 12 has a similar platform portion 15. Each of these platform portions 14 and 15 has a row of apertures 16 in it and at the ends of each row of apertures 16 are apertures 17 which are similarly shaped but positioned differently. The centerlines of all of the apertures in one platform portion lie in a single plane and are spaced with a distance *d*, between them. The distance *d*, is equal to the predetermined increment or .200 inch. The spacing between the centerlines of the apertures in one platform portion and the centerlines of the apertures in the other platform portion is an integral multiple of the .200 inch increment.

Figure 3:
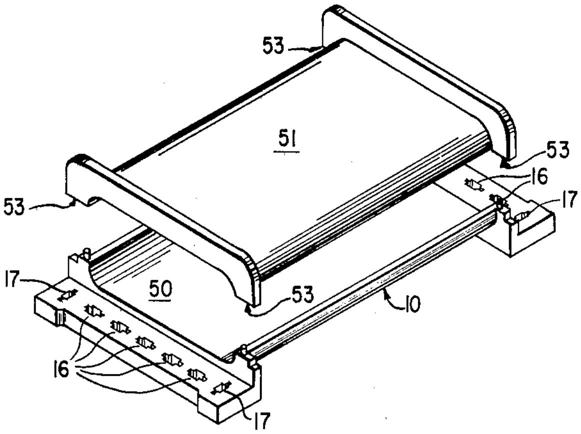
FIG. 3 is an isometric view of an alternate embodiment of the support structure or bobbin.
Figure 6:
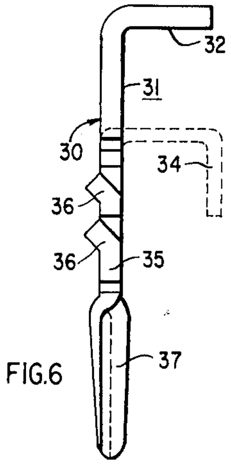
FIG. 6 is a side view of the terminal.
Figure 4:
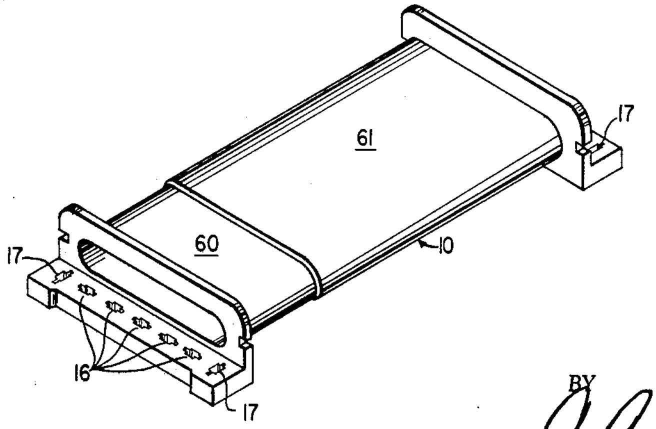
FIG. 4 is an isometric view of another alternate embodiment of the support structure or bobbin.
Figure 7:
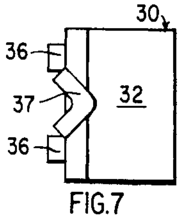
FIG. 7 is a bottom view of the terminal.

The support structure 10 can be molded as one integral piece or as two separate pieces as shown in FIGS. 3 and 4. In FIG. 3 the support structure 10 is comprised of a base piece 50 and a cover piece 51 which mates with the base piece 50. When these two pieces are put together they comprise a structure identical in form to one which is one integral piece. Four pegs 52 can be molded on base piece 50 to mate with four holes 53 which are not visible in FIG. 3 but can be molded into the underside of cover piece 51. This insures a proper mating of the base and cover pieces as the relay is assembled. In FIG. 4 the support structure 10 is comprised of two end pieces 60 and 61 which telescope into each other to form the complete structure.

The encapsulated reed switches 20 are of a type well known in the art. The actual contacts which are contained in the glass capsule 23 and operate in response to the creation of a magnetic field are not shown. Lead-out elements 21 extend from both ends of the capsule 23 with the end portion 22 of these lead-out elements flattened in the usual manner. Each capsule 23 is of diameter $d_2$ which is greater than the increment $d_1$.

The terminals 30 have each an upper portion 31 which ends in a tab 32 which is perpendicular to the main portion of the terminal. Notches 33 are formed in the terminal to make it easier to bend the upper portion 31 into the position 34. The middle portion 35 of the terminals 30 has four small locking tabs 36 on it. The lower portion 37 of the terminal has a V-shaped cross section and can be inserted into a mounting hole 71 in the printed circuit card 70.

If the support structure 10 is comprised of one integral piece, the assembling of the relay would begin by winding the coil 40 on the support structure 10 between the flanges 11 and 12. A layer of insulating tape 41 is wrapped around the coil 40 followed by a flexible wrap of magnetic material 42, and then another layer of insulating tape 43. It is to be understood that more than one coil could be wound on the support structure if desired. The flexible wrap of magnetic material provides a partial return path for the magnetic flux and also provides magnetic shielding for the relay.

The assembling operation continues with the insertion of a terminal 30 into each of the apertures 16 and 17. The locking tabs 36 on the middle portion of the terminal hold the terminal in the aperture by interfering with the wall of the aperture. If only one coil is wound on the support structure, it would be unnecessary to insert terminals in apertures 17 in one of the platform portions. Since the apertures into which the terminals are inserted are spaced at the increment $d_1$, the terminals are spaced at this same increment. The lead out wires 44 of the coil are then wrapped around the tabs on the upper portion of the terminals in apertures 17 and soldered in place. The upper portion 31 of one of the terminals 30 inserted in apertures 16 is then bent forward into position 34 to permit the introduction of the reed switches 20 into the tunnel 13 of the support structure 10. After a particular reed switch is inserted, it is moved over so that another reed switch can be inserted. When all of the reed switches 20 are in the tunnel 13, the terminal which was bent is straightened up again. Then the reed switches 20 are positioned within the tunnel 13 such that each switch is separately suspended therein with the flattened portions 22 of the lead-out elements 21 resting on the tabs 32 of the terminals 30. Since the diameter $d_2$ of the reed capsule is greater than the distance $d_1$ at which the terminals are spaced, the center reed switch has its lead-out elements positioned on-center on the tabs of the terminals, but the switches on each side have their lead-out elements mounted off-center on the tabs of the terminals. After the reed switches 20 are properly positioned, the flattened portions 22 of the lead out elements 21 are spot welded to the tabs 32 on the terminals 30 to maintain the switches 20 in the proper position. When the welding operation is complete, the assembly of the relay is complete, and the relay can be plugged into the printed circuit card 70 which has holes 71 drilled and positioned to receive the lower portions 37 of the terminals. The terminals would then be soldered in the holes 71 so that the relay would be permanently connected to the circuit board. More than one relay could be associated with a particular printed circuit card if desired..

Figure 2:
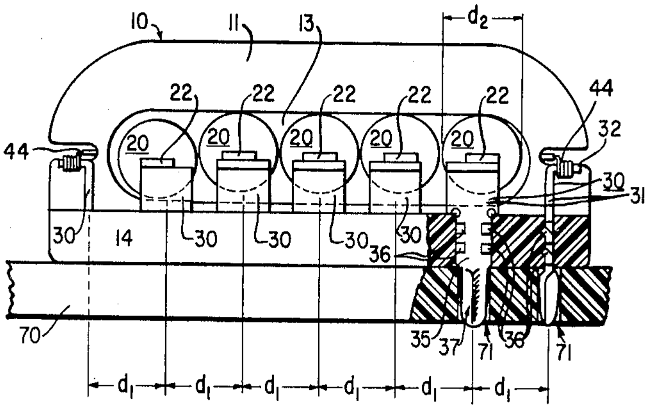
FIG. 2 is a front elevational view of the relay and printed circuit card with a portion of both sectioned to show the construction of the terminals and the manner in which they are inserted into mounting holes in the printed circuit card.
Figure 5:
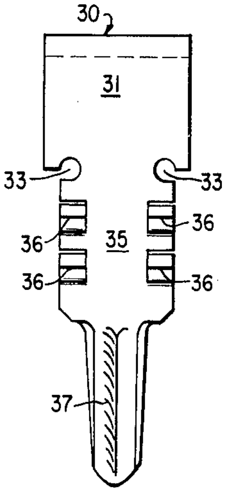
FIG. 5 is a front view of the terminal.

Since it is possible that one of the reed switches 20 in a particular relay would fail, it is desirable that provision be made to replace the failed switch without replacing the whole module or removing the relay from the printed circuit card. This is possible with the relay described above. When one of the switches 20 needs to be replaced its particular lead-out elements 21 can be snipped off at each end between the capsule 23 and the terminal 30. The tabs 32 of the two terminals 30 associated with the switch can be then broken off. Finally one of the terminals 30 can be bent forward to permit removal of the switch and replacement with another. With the replacement switch in the tunnel, the bent terminal can be restored to an upright position and the lead-out elements on the new switch can be soldered to the terminals. The new switch will ride a little lower in the tunnel 13, but there is sufficient clearance between the capsules 23 and the tunnel to permit this. The switch on the left in FIG. 2 shows how a replacement capsule appears in the module.

If the support structure 10 shown in FIG. 3 were used in the assembly of the relay, the operation of assembling would be somewhat different. The terminals 30 would be first inserted into the apertures 16 and 17 in both platform portions 14 and 15 on the base piece 50. Then the reed switches 20 would be positioned on the terminals 30 in apertures 16 and the flattened portions of the lead-out elements 21 welded to the tabs 32 on the terminals 30. Then the cover piece 51 would be placed on the base piece 50 over the reed switches 20. The coil 40 would finally be wound on the support structure 10 along with the other materials previously mentioned to complete the assembly.

If the support structure 10 shown in FIG. 4 were used in the assembly of the relay, the operation of assembling would begin with the insertion of terminals 30 in all of the apertures in both end pieces 60 and 61. Then the reed switches 20 would be inserted into the open end of the tunnel in end piece 60. Next the end piece 61 would be telescoped over the end piece 60, and the reed switches 20 would be positioned on the tabs 32 of the terminals 30 and welded. The coil 40 and other layers of material would finally be wound on the support structure 10 to complete the assembly of the relay.

It is to be understood that the relay need not contain the five switches shown since any number from two through eight could be incorporated in this type of relay with the proper modification of the support structure. The problem of mating the relay with the printed circuit card is solved by providing for off-center mounting of the lead-out elements of the reed switches on terminals which are spaced at the predetermined mounting increment. The mounting arrangement, which suspends each switch capsule individually in the tunnel, provides mechanical isolation between individual capsules and protects them from damage due to shock. The removal and replacement of individual switches is also facilitated by this mounting arrangement, and the relay which results is of simple but efficient construction.

It will be apparent to those skilled in the art that many modifications of this relay would be made without departing from the scope of this invention as claimed.

What is claimed is:

1. A reed relay for mounting on a printed circuit card having mounting holes with centers spaced at a predetermined increment, said relay comprising, in combination:

a support structure having two ends with a flange on each end and a tunnel extending continuously through said support structure from end to end, each of said flanges having a platform portion with a plurality of apertures therein disposed in a single row, said apertures in each row having centers spaced at said predetermined increment;

a control coil wound on said support structure between said flanges;

terminals mounted in said apertures in said platform portions with an upper portion and a lower portion of each terminal extending respectively above and below said platform portion, each of said upper portions having a tab thereon extending parallel to said platform portion, each of said lower portions so constructed that it can be inserted into one of said mounting holes in said printed circuit card; and a plurality of encapsulated reed switches having lead-out elements extending from each end of each switch, said switches having a diameter other than said predetermined increment, each of said switches being separately suspended within said tunnel between a pair of opposite terminals with said lead-out elements mounted on the tabs on said terminals, some of said lead-out elements being mounted off-center on said tabs so that said switches may be mounted adjacent to each other without touching.

2. A reed relay as claimed in claim 1, wherein said upper portions of said terminals are so constructed that they can be bent to permit removal and replacement of said reed switches.

3. A reed relay as claimed in claim 1, wherein said support structure comprises a base piece and a cover piece mountable on said base piece, whereby said reed switches can be suspended in said tunnel with said lead-out elements mounted on the tabs on said terminals before said cover piece is mounted on said base piece and said coil is wound on said support structure.

4. A reed relay as claimed in claim 1, wherein said support structure comprises two end pieces telescoping together whereby said reed switches can be introduced into said tunnel before said end pieces are telescoped together and said leadout elements on said switches are mounted on said terminals.

5. A reed relay for mounting on a printed circuit card having mounting holes with centers spaced at a predetermined increment, said relay comprising, in combination:

a support structure having two ends wtih a flange on each end and a tunnel extending continuously through said support structure from end to end, each of said flanges having a platform portion with at least one aperture therein;

a control coil wound on said support structure between said flanges;

terminals mounted in said apertures in said platform portions with an upper portion and a lower portion of each terminal extending respectively above and below said platform portion, each of said upper portions having a tab thereon extending parallel to said platform portion, each of said lower portions so constructed that it can be inserted into one of said mounting holes in said printed circuit card; and at least one encapsulated reed switch having leadout elements extending from each end thereof, said switch being suspended within said tunnel between a pair of opposite terminals with said lead-out elements mounted on the tabs on said terminals.

References Cited by the Examiner

UNITED STATES PATENTS

| | | | |
|---|---|---|---|
| 2,889,424 | 6/1959 | Glore et al | 200—87 |
| 3,070,766 | 12/1962 | Purdy | 336—198 |
| 3,112,898 | 12/1963 | Stahl | 336—198 |
| 3,167,625 | 1/1965 | Russo | 200—87 |

OTHER REFERENCES

Multiple Reed Switch, P. S. Bolan, IBM Technical Disclosure, vol. 4, No. 7, December 1961, page 37.

BERNARD A. GILHEANY, *Primary Examiner.*

B. DOBECK, *Assistant Examiner.*